US 6,602,030 B1

(12) United States Patent
Markbreit

(10) Patent No.: US 6,602,030 B1
(45) Date of Patent: Aug. 5, 2003

(54) KEY DUPLICATING MACHINE

(75) Inventor: Dani Markbreit, Azur (IL)

(73) Assignee: Mul-T-Lock Technologies Ltd., Yavne (IL)

( * ) Notice: Subject to any disclaimer, the term of this patent is extended or adjusted under 35 U.S.C. 154(b) by 0 days.

(21) Appl. No.: 09/701,876

(22) PCT Filed: Jun. 8, 1999

(86) PCT No.: PCT/IL99/00307

§ 371 (c)(1),
(2), (4) Date: Jan. 5, 2001

(87) PCT Pub. No.: WO99/64196

PCT Pub. Date: Dec. 16, 1999

(30) Foreign Application Priority Data

Jun. 8, 1998 (IL) .................................................. 124815

(51) Int. Cl.[7] .................................................. B23C 3/35
(52) U.S. Cl. .......................................... 409/81; 409/82
(58) Field of Search ........................... 409/81, 82, 83; 408/14, 53, 65, 103, 241 S, 52, 241 G, 710, 42, 48

(56) References Cited

U.S. PATENT DOCUMENTS

| 2,158,761 A | * | 5/1939 | Olson ........................... 409/82 |
| 2,171,684 A | | 9/1939 | Collins |
| 2,176,106 A | * | 10/1939 | Segal ........................... 409/82 |
| 3,011,411 A | * | 12/1961 | Raymond ...................... 409/82 |
| 3,113,329 A | * | 12/1963 | Andres et al. ............... 408/141 |
| 3,276,328 A | * | 10/1966 | Schreiber et al. .............. 409/81 |
| 3,415,146 A | * | 12/1968 | Schroeder, Jr. ............... 408/88 |
| 4,061,437 A | * | 12/1977 | Strange et al. ................. 408/42 |
| 4,251,173 A | | 2/1981 | Saucendo |
| 4,256,423 A | * | 3/1981 | Juskevic ........................ 409/81 |
| 4,521,142 A | * | 6/1985 | Juskevic ........................ 409/81 |
| 4,687,389 A | * | 8/1987 | Santii et al. ................... 409/81 |
| 4,717,294 A | * | 1/1988 | Grasser ......................... 409/81 |
| 5,259,708 A | * | 11/1993 | Brice ............................ 409/81 |
| 5,660,509 A | * | 8/1997 | Cole et al. ..................... 409/81 |
| 5,833,406 A | * | 11/1998 | Chies et al. ................. 409/208 |

FOREIGN PATENT DOCUMENTS

| FR | 1 442 659 | | 9/1966 | |
| JP | 201708 A | * | 11/1984 | .................. 408/81 |
| NL | 163150 A | * | 3/1980 | .................. 409/81 |

* cited by examiner

Primary Examiner—Daniel W. Howell
(74) Attorney, Agent, or Firm—Nixon & Vanderhye P.C.

(57) ABSTRACT

A key duplicating machine includes a housing and an electrical motor mounted therewithin. Two rotatable machining heads are powered by the motor for forming key cuts on a key blank. A key blank clamping assembly securely and removably mounts a key blank during engagement thereof with the machining heads. A key blank translation assembly selectably positions the key blank clamping assembly such that a key blank mounted thereon is brought into desired engagement with the machining heads. A user controllable tumbler disk assembly operatively associated with the machining heads selectably determines the depth of the key cuts formed thereby on a key blank mounted on the key blank clamping assembly. The key blank translation assembly includes a guide wire disposed below the machining heads such that debris from formation of the key cuts does not tend to collect thereon and interfere with translation of the key blanking clamping assembly.

5 Claims, 4 Drawing Sheets

KEY DUPLICATING MACHINE

FIELD OF THE INVENTION

The present invention relates generally to key duplicating machines.

BACKGROUND OF THE INVENTION

Key duplicating machines are well known. These machines permit cutting, or otherwise forming, key cuts on a key blank in accordance with a given key-cut combination. Key duplicating machines are known for forming virtually any kind of key cut on any kind of key blank, including forming keys used with telescopic pins.

SUMMARY OF THE INVENTION

The present invention seeks to provide an improved key duplicating machine particular useful for forming keys used with telescopic pins.

There is thus provided in accordance with a preferred embodiment of the present invention a key duplicating machine including a housing, an electric motor mounted within the housing, first and second rotatable machining heads powered by the electric motor for forming key cuts on a key blank, a key blank clamping assembly for securely and removably mounting a key blank during engagement thereof with the first and second rotatable machining heads, a key blank translation assembly for selectably positioning the key blank clamping assembly such that a key blank mounted thereon is brought into desired engagement with the first and second rotatable machining heads, and a user-controllable tumbler disk assembly operatively associated with the first and second rotatable machining heads for selectably determining the depth of the key cuts formed thereby on a key blank mounted on the key blank clamping assembly.

In accordance with a preferred embodiment of the present invention the user-controllable tumbler disk assembly includes a plurality of adjacent disks which are rotatable about a generally horizontal axis and wherein the rotational orientation of each disk determines the depth of a corresponding key cut.

Further in accordance with a preferred embodiment of the present invention the user-controllable tumbler disk assembly also includes a user engageable handle extending radially outward from each disk, thereby to allow a user to individually rotationally position each disk about the horizontal axis.

Additionally in accordance with a preferred embodiment of the present invention the key blank translation assembly includes a guide wire disposed below the first and second machining heads such that debris from formation of the key cuts does not tend to collect thereon and interfere with translation of the key blank clamping assembly. Preferably the key blank translation assembly can be oriented for both right-handed and left-handed users.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
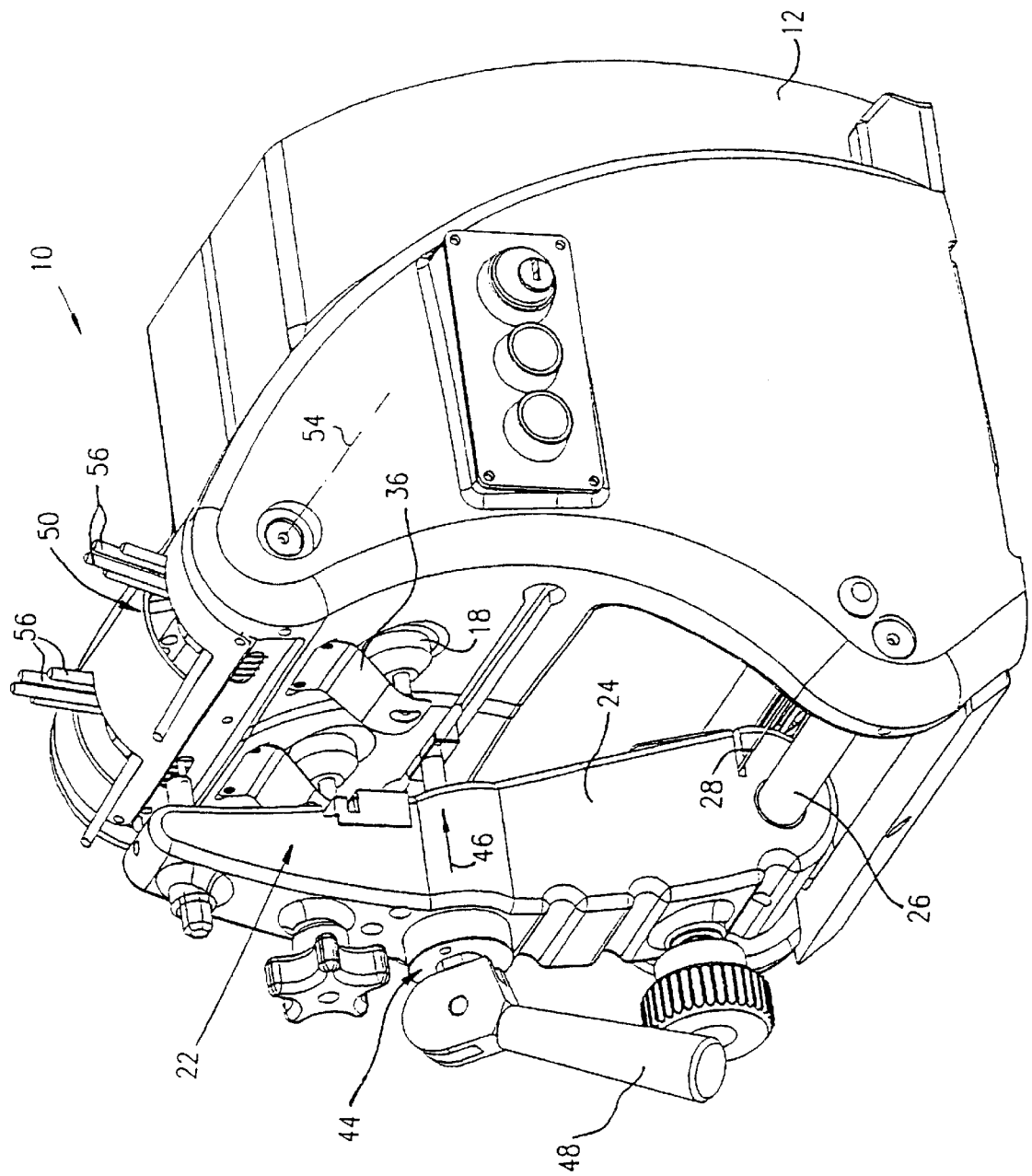
FIGS. 1 and 2 are simplified pictorial and front view illustrations, respectively, of a key duplicating machine constructed and operative in accordance with a preferred embodiment of the present invention.
Figure 2:
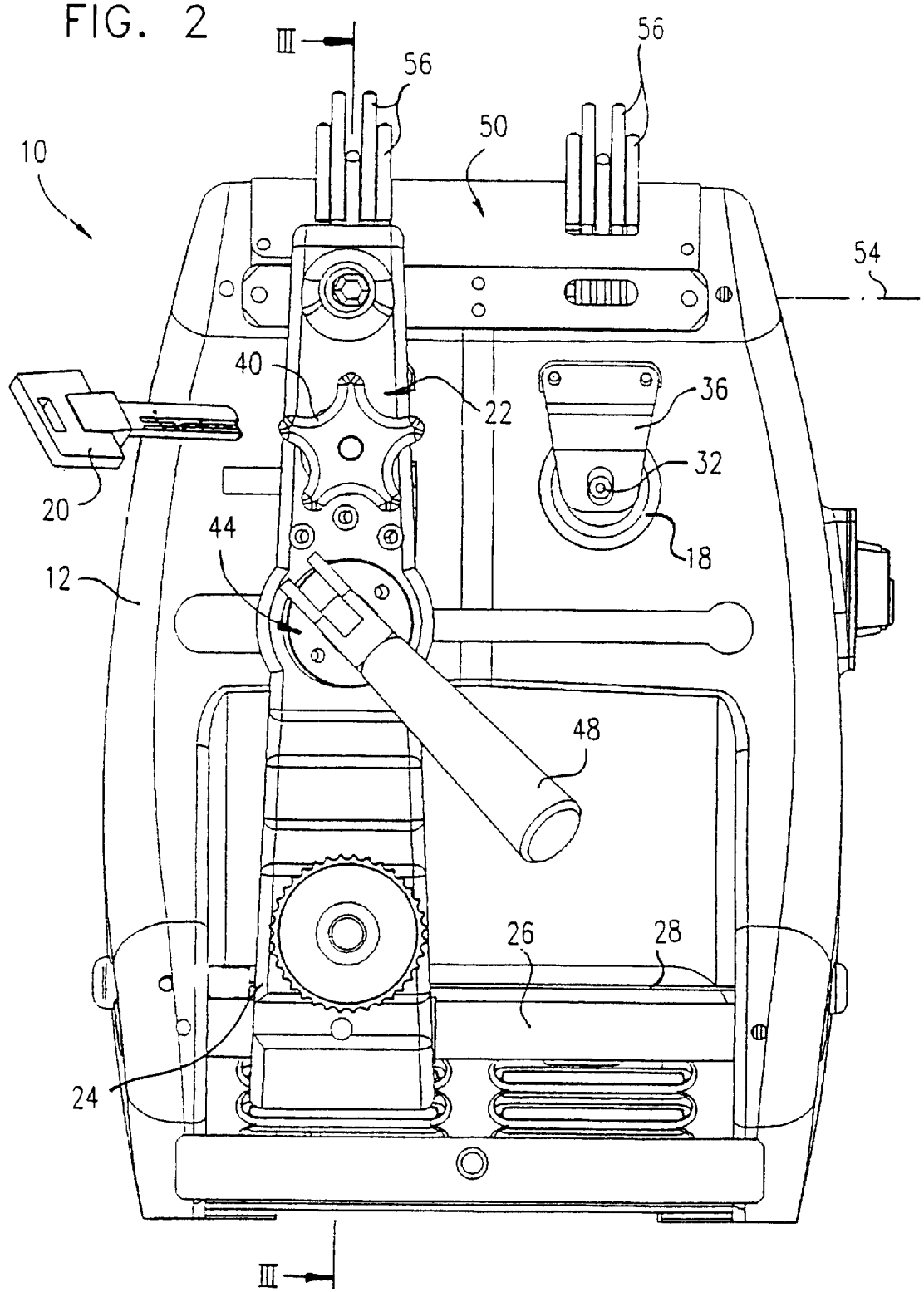
Figure 3:
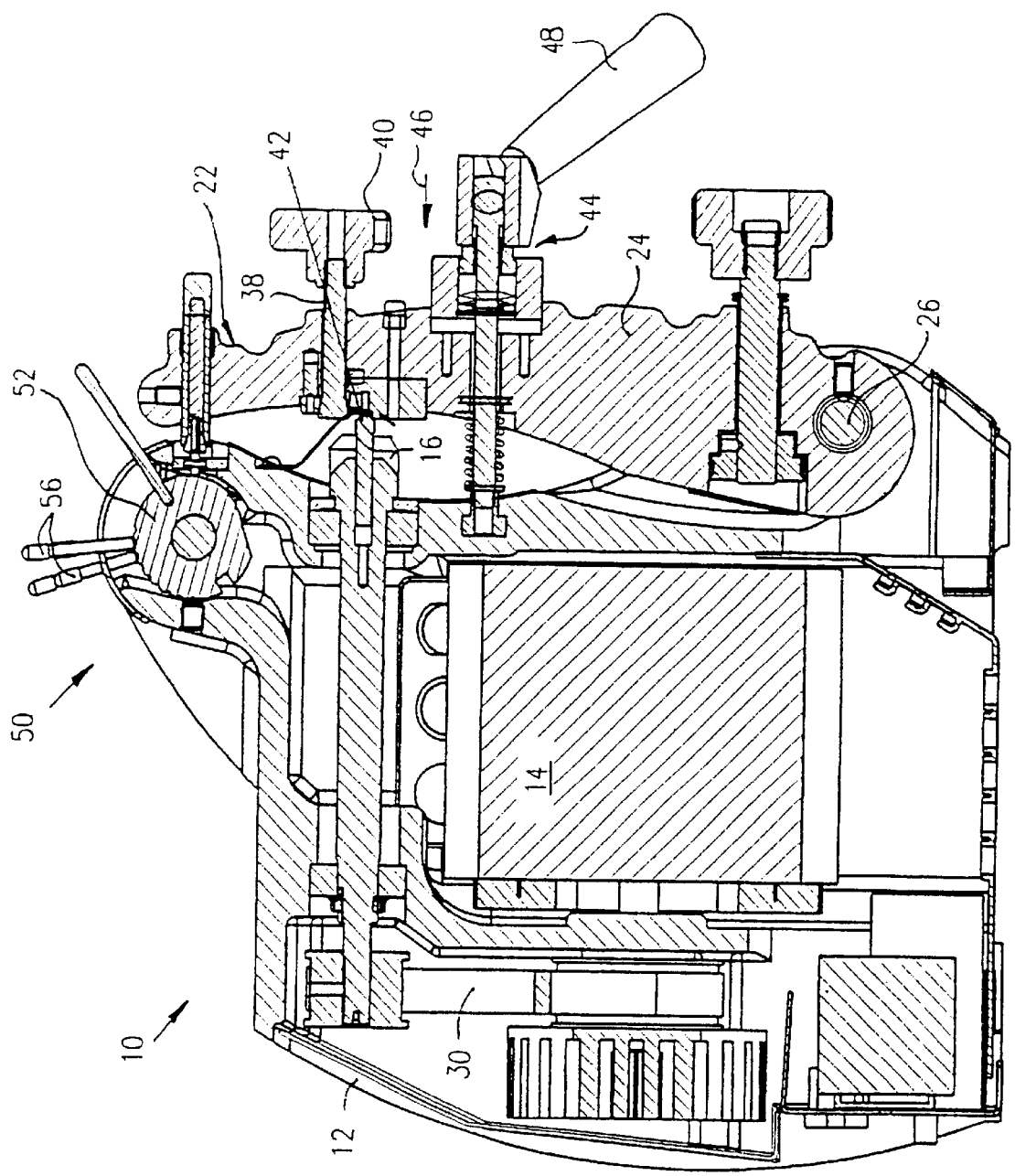
FIG. 3 is a simplified sectional illustration of the key duplicating machine of FIGS. 1 and 2, taken along lines III—III in FIG. 2.

Reference is now made to FIGS. 1–3 which illustrate a key duplicating machine 10 constructed and operative in accordance with a preferred embodiment of the present invention.

Key duplicating machine 10 preferably includes a housing 12, an electric motor 14 (FIG. 3) mounted within housing 12, and first and second rotatable machining heads 16 and 18, respectively, powered by electric motor 14 for forming key cuts on a key blank 20 (FIG. 2).

A key blank clamping assembly 22 is provided for securely and removably mounting key blank 20 during engagement thereof with the first and second rotatable machining heads 16 and 18. A key blank translation assembly 24 is provided for selectably positioning key blank clamping assembly 22 such that key blank 20 mounted thereon is brought into desired engagement with first and second rotatable machining heads 16 and 18. Key blank translation assembly 24 is preferably mounted along a rod 26. Assembly 24 translates along rod 26 and is further guided in this travel by a guide wire 28. Guide wire 28 is disposed below first and second machining heads 16 and 18 such that debris from formation of the key cuts does not tend to collect thereon and interfere with translation of key blank clamping assembly 22.

Motor 14 is operatively connected to first and second rotatable machining heads 16 and 18 by means of a belt 30 (FIG. 3) or any other kind of suitable linkage. A drill bit 32 (FIG. 2) is mounted on each of first and second rotatable machining heads 16 and 18. Preferably a shield 36, formed of bent metal, for example, protects the user from inadvertent damage from the drill bits 32.

Key blank clamping assembly 22 preferably includes a clamping bar 38 connected to a knob 40. Key blank 20 is inserted in a groove 42 (seen best in FIG. 4) formed in assembly 22. By turning knob 40, clamping bar 38 clamps key blank 20 in groove 42 of assembly 22, thereby fixing key blank 20 in place for forming key cuts thereon.

Key blank translation assembly 24 preferably includes a mechanism 44 for selectively moving key blank clamping assembly 22 generally in the direction of an arrow 46 (FIGS. 1, 3 and 4), so as to bring key blank 20 against drill bit 32 of either of first and second rotatable machining heads 16 and 18, wherein drill bit 32 forms the appropriate key cut on key blank 20. Mechanism 44, which is preferably spring-loaded, includes a handle 48 which can be oriented for both right-handed and left-handed users. For example, in FIG. 2, it is seen that handle 48 extends towards the right, this being suitable for use by a right-handed person. Handle 48 can be easily removed and re-mounted to extend towards the left, this being suitable for use by a left-handed person.

A user-controllable tumbler disk assembly 50 is operatively associated with first and second rotatable machining heads 16 and 18 for selectably determining the depth of the key cuts formed thereby on key blank 20 mounted on key blank clamping assembly 22.

In accordance with a preferred embodiment of the present invention user-controllable tumbler disk assembly 50 includes a plurality of adjacent disks 52 which are rotatable about a generally horizontal axis 54 and wherein the rotational orientation of each disk 52 determines the depth of a corresponding key cut. Preferably a user engageable handle 56 extends radially outward from each disk 52, thereby allowing a user to individually rotationally position each disk 52 about horizontal axis 54.

Figure 4:
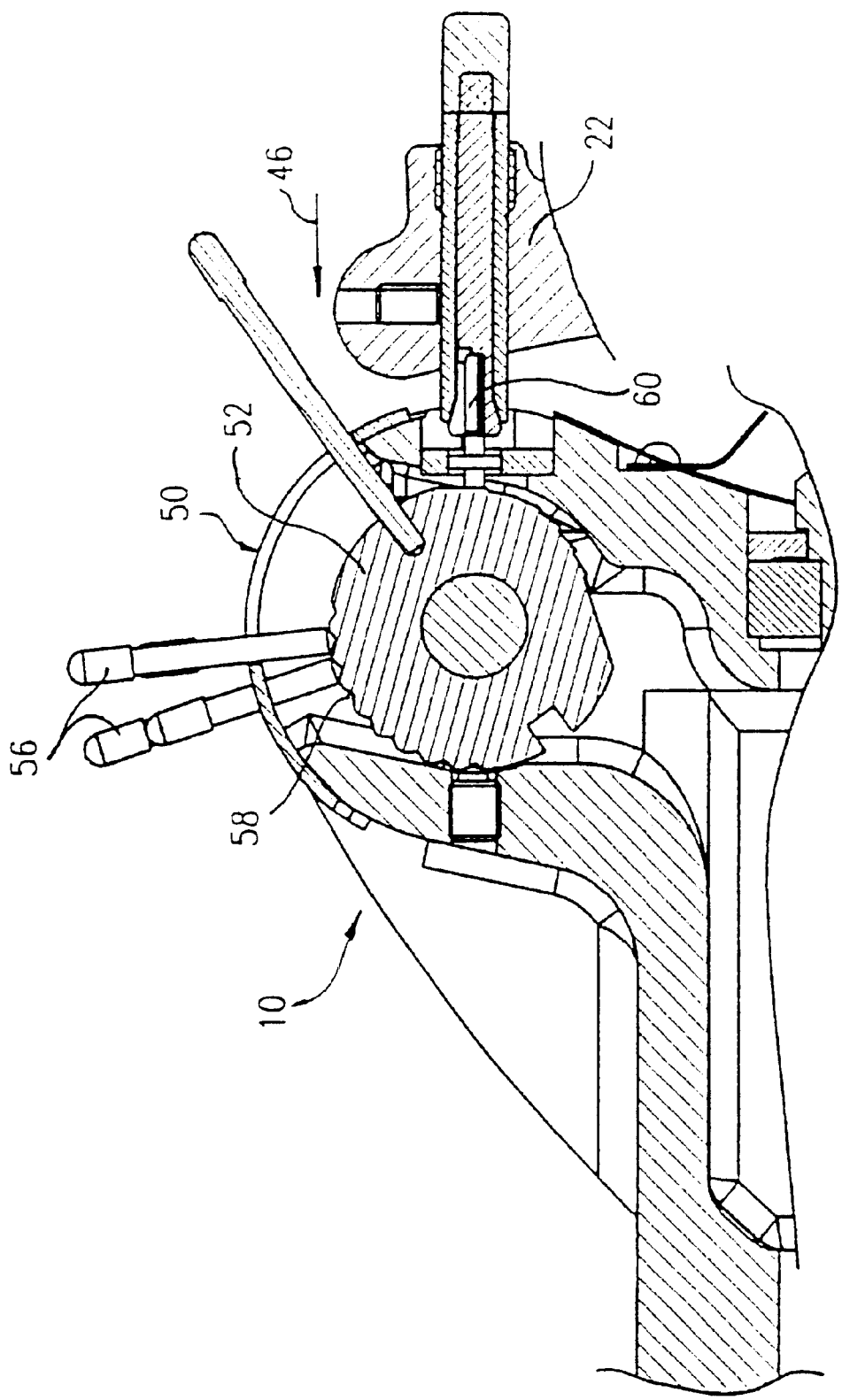
FIG. 4 is a simplified, enlarged sectional illustration of a user-controllable tumbler disk assembly of the key duplicating machine.

As seen more clearly in FIG. 4, disk 52 has a plurality of notches 58 formed therein of varying depths corresponding to (not necessarily equal to) the different depths of the desired key cuts. A pin 60 protrudes from key blank clamping assembly 22 and is adapted to about against disks 52. The distance that pin 60 moves in the direction of arrow 46 before stopping against disk 52 is determined by the rotational position of the particular disk 52. Thus, once the user has rotated the appropriate disk 52 about horizontal axis 54 to the correct position in accordance with the desired key-cut combination, pin 60 translates generally linearly a certain distance before abutting against disk 52. The amount of translation in the direction of arrow 46 is the desired key cut depth. Each disk 52 is thus rotated to its appropriate position and the desired plurality of key cuts is readily formed on key blank 22.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A key duplicating machine comprising:

a housing;

an electrical motor mounted within said housing;

first and second rotatable machining heads powered by said electric motor for forming key cuts on a key blank;

a key blank clamping assembly for securely and removably mounting a key blank during engagement thereof with said first and second rotatable machining heads; and a key blank translation assembly for selectably positioning said key blank clamping assembly such that a key blank mounted thereon is brought into desired engagement with said first and second rotatable machining heads;

characterized by a user-controllable tumbler disk assembly operatively associated with said first and second rotatable machining heads for selectably determining the depth of the key cuts formed thereby on a key blank mounted on said key blank clamping assembly, further characterized in that said key blank translation assembly comprises a guide wire disposed below said first and second machining heads such that debris from formation of said key cuts does not tend to collect thereon and interfere with translation of said key blanking clamping assembly.

2. A key duplicating machine according to claim 1 further characterized in that said user-controllable tumbler disk assembly comprises a plurality of adjacent disks which are rotatable about a generally horizontal axis and wherein the rotational orientation of each disk determines the depth of a corresponding key cut.

3. A key duplicating machine according to claim 1 further characterized in that said user-controllable tumbler disk assembly also includes a user engageable handle extending radially outward from each disk, thereby to allow a user to individually rotationally position each disk about said horizontal axis.

4. A key duplicating machine comprising:

a housing;

an electrical motor mounted within said housing;

first and second rotatable machining heads powered by said electric motor for forming key cuts on a key blank;

a key blank clamping assembly for securely and removably mounting a key blank during engagement thereof with said first and second rotatable machining heads; and a key blank translation assembly for selectably positioning said key blank clamping assembly such that a key blank mounted thereon is brought into desired engagement with said first and second rotatable machining heads, wherein said key blank translation assembly comprises a spring loaded mechanism including a removable handle mountable in two selectable orientations including a first orientation in which the handle extends toward the right and a second orientation in which the handle extends toward the left.

5. A key duplicating machine according to claim 1 further characterized in that said key blank translation assembly comprises a spring loaded mechanism including a removable handle mountable in two selectable orientations including a first orientation in which the handle extends toward the right and a second orientation in which the handle extends toward the left.

* * * * *